US008037009B2

(12) United States Patent
Hibbets

(10) Patent No.: US 8,037,009 B2
(45) Date of Patent: Oct. 11, 2011

(54) SYSTEMS AND METHODS FOR LINKING AN ISSUE WITH AN ENTRY IN A KNOWLEDGEBASE

(75) Inventor: Jason S. Hibbets, Raleigh, NC (US)

(73) Assignee: Red Hat, Inc., Raleigh, NC (US)

(*) Notice: Subject to any disclaimer, the term of this patent is extended or adjusted under 35 U.S.C. 154(b) by 575 days.

(21) Appl. No.: 11/845,487

(22) Filed: Aug. 27, 2007

(65) Prior Publication Data
US 2009/0063386 A1 Mar. 5, 2009

(51) Int. Cl.
G06F 15/00 (2006.01)
G06F 15/18 (2006.01)

(52) U.S. Cl. ............. 706/62; 706/45; 706/46; 706/47; 706/48; 707/603; 707/665; 707/758; 707/739; 707/776

(58) Field of Classification Search .............. None
See application file for complete search history.

(56) References Cited

U.S. PATENT DOCUMENTS

| | | | |
|---|---|---|---|
| 5,649,182 A * | 7/1997 | Reitz .................................. 1/1 | |
| 6,223,165 B1 | 4/2001 | Lauffer | |
| 6,345,257 B1 * | 2/2002 | Jarrett ........................... 705/305 | |
| 6,374,261 B1 * | 4/2002 | Alvarez et al. ...................... 1/1 | |
| 6,446,058 B1 * | 9/2002 | Brown ............................ 706/60 | |
| 6,477,667 B1 * | 11/2002 | Levi et al. ...................... 714/57 | |
| 6,493,702 B1 | 12/2002 | Adar et al. | |
| 6,519,629 B2 | 2/2003 | Harvey et al. | |
| 6,691,162 B1 | 2/2004 | Wick | |
| 6,735,592 B1 | 5/2004 | Neumann et al. | |
| 6,739,508 B2 | 5/2004 | Ushioda et al. | |
| 6,938,068 B1 | 8/2005 | Kraft et al. | |
| 6,988,126 B2 * | 1/2006 | Wilcock et al. .............. 709/204 | |
| 7,007,235 B1 | 2/2006 | Hussein et al. | |
| 7,028,228 B1 * | 4/2006 | Lovy et al. ...................... 714/57 | |
| 7,069,480 B1 * | 6/2006 | Lovy et al. ...................... 714/57 | |
| 7,159,011 B1 | 1/2007 | Knight et al. | |
| 7,359,894 B1 | 4/2008 | Liebman et al. | |
| 7,382,247 B2 | 6/2008 | Welch et al. | |
| 7,437,382 B2 | 10/2008 | Zhang et al. | |
| 7,472,071 B2 | 12/2008 | Marks et al. | |
| 7,543,232 B2 | 6/2009 | Easton et al. | |
| 7,546,254 B2 | 6/2009 | Bednarek | |
| 7,548,914 B2 | 6/2009 | Bell et al. | |
| 7,558,828 B1 | 7/2009 | Panzer | |
| 7,600,160 B1 * | 10/2009 | Lovy et al. ...................... 714/57 | |
| 7,603,350 B1 | 10/2009 | Guha | |
| 7,613,690 B2 | 11/2009 | Chowdhury et al. | |
| 7,617,127 B2 | 11/2009 | Hunt et al. | |

(Continued)

FOREIGN PATENT DOCUMENTS

WO 99/39279 8/1999

(Continued)

*Primary Examiner* — Omar Fernandez Rivas
(74) *Attorney, Agent, or Firm* — Lowenstein Sandler PC

(57) ABSTRACT

An embodiment relates generally to a method of linking. The method includes receiving a message associated with at least one technical issue being resolved in a first system and containing non-confidential information and searching a knowledgebase in a second system based on the message to obtain at least one related entry. The method also includes associating at least one related entry with the non-confidential information of the message, updating at least one related entry with the non-confidential information, or creating a new entry with the non-confidential information, in the knowledgebase.

16 Claims, 6 Drawing Sheets

U.S. PATENT DOCUMENTS

| | | |
|---|---|---|
| 7,664,747 B2 | 2/2010 | Petras et al. |
| 7,668,838 B2 | 2/2010 | Baio et al. |
| 7,698,242 B2 * | 4/2010 | Van Camp et al. ............. 706/45 |
| 7,752,314 B2 | 7/2010 | Trevor et al. |
| 7,788,322 B2 | 8/2010 | Busey |
| 7,925,788 B2 * | 4/2011 | Hibbets ........................ 709/246 |
| 2001/0032244 A1 | 10/2001 | Neustel |
| 2001/0037317 A1 | 11/2001 | Freiwirth et al. |
| 2002/0049738 A1 | 4/2002 | Epstein |
| 2002/0055935 A1 * | 5/2002 | Rosenblum ................ 707/104.1 |
| 2002/0087520 A1 | 7/2002 | Meyers |
| 2002/0123983 A1 * | 9/2002 | Riley et al. ........................ 707/1 |
| 2002/0169783 A1 * | 11/2002 | Kreulen et al. ............... 707/102 |
| 2002/0174106 A1 | 11/2002 | Martin |
| 2002/0194164 A1 | 12/2002 | Morrow et al. |
| 2003/0028525 A1 | 2/2003 | Santos et al. |
| 2003/0033302 A1 | 2/2003 | Banerjee et al. |
| 2003/0101083 A1 | 5/2003 | Venkatesh et al. |
| 2003/0144895 A1 | 7/2003 | Aksu et al. |
| 2003/0196094 A1 | 10/2003 | Hillis et al. |
| 2003/0221123 A1 * | 11/2003 | Beavers ........................ 713/201 |
| 2004/0054520 A1 | 3/2004 | Dehlinger et al. |
| 2004/0107125 A1 | 6/2004 | Guheen et al. |
| 2004/0199573 A1 * | 10/2004 | Schwartz et al. ............. 709/201 |
| 2005/0120011 A1 | 6/2005 | Dehlinger et al. |
| 2005/0138115 A1 | 6/2005 | Llamas et al. |
| 2005/0144151 A1 * | 6/2005 | Fischman et al. ................ 706/45 |
| 2005/0256866 A1 | 11/2005 | Lu et al. |
| 2006/0004601 A1 | 1/2006 | Marks |
| 2006/0013367 A1 * | 1/2006 | Sawyer et al. ............. 379/88.01 |
| 2006/0064486 A1 * | 3/2006 | Baron et al. ................... 709/224 |
| 2006/0106788 A1 | 5/2006 | Forrest |
| 2006/0122992 A1 | 6/2006 | Bellaiche et al. |
| 2006/0136869 A1 * | 6/2006 | Lamm et al. .................. 717/109 |
| 2006/0161524 A1 | 7/2006 | Roy et al. |
| 2006/0167846 A1 | 7/2006 | Nevin et al. |
| 2006/0200356 A1 | 9/2006 | Wan |
| 2006/0252547 A1 | 11/2006 | Mizrahi et al. |
| 2006/0271545 A1 | 11/2006 | Youn et al. |
| 2006/0277091 A1 | 12/2006 | Kochikar et al. |
| 2006/0282304 A1 | 12/2006 | Bedard et al. |
| 2006/0288087 A1 | 12/2006 | Sun |
| 2007/0094228 A1 | 4/2007 | Nevin et al. |
| 2007/0106659 A1 | 5/2007 | Lu et al. |
| 2007/0174247 A1 | 7/2007 | Xu et al. |
| 2007/0174254 A1 | 7/2007 | Toong et al. |
| 2007/0179835 A1 | 8/2007 | Ott et al. |
| 2007/0198319 A1 | 8/2007 | Sciuk |
| 2007/0198510 A1 | 8/2007 | Ebanks |
| 2007/0219995 A1 | 9/2007 | Heumann et al. |
| 2007/0260587 A1 | 11/2007 | Mohan |
| 2007/0274495 A1 | 11/2007 | Youd et al. |
| 2007/0282781 A1 | 12/2007 | Mathiesen et al. |
| 2007/0288292 A1 | 12/2007 | Gauger |
| 2008/0021884 A1 | 1/2008 | Jones et al. |
| 2008/0046394 A1 | 2/2008 | Zhou et al. |
| 2008/0059447 A1 | 3/2008 | Winner et al. |
| 2008/0082486 A1 | 4/2008 | Lermant et al. |
| 2008/0082607 A1 | 4/2008 | Sastry et al. |
| 2008/0091686 A1 | 4/2008 | Beard |
| 2008/0098109 A1 * | 4/2008 | Faihe et al. .................... 709/224 |
| 2008/0147741 A1 | 6/2008 | Gonen et al. |
| 2008/0147863 A1 | 6/2008 | Evanchik et al. |
| 2008/0162376 A1 | 7/2008 | Roulston |
| 2008/0201321 A1 | 8/2008 | Fitzpatrick et al. |
| 2008/0228504 A1 * | 9/2008 | Nguyen et al. .................... 705/1 |
| 2008/0281769 A1 | 11/2008 | Hibbets |
| 2008/0301091 A1 | 12/2008 | Hibbets et al. |
| 2008/0301115 A1 | 12/2008 | Mattox et al. |
| 2008/0306932 A1 | 12/2008 | Faus et al. |
| 2009/0187626 A1 | 7/2009 | Degaugue |

FOREIGN PATENT DOCUMENTS

| | | |
|---|---|---|
| WO | 01/35272 A2 | 5/2001 |
| WO | 01/53970 A2 | 7/2001 |

* cited by examiner

SYSTEMS AND METHODS FOR LINKING AN ISSUE WITH AN ENTRY IN A KNOWLEDGEBASE

FIELD

This invention relates generally to a knowledgebase, more particularly, to systems and methods for linking closed issues in a support database with the knowledgebase.

DESCRIPTION OF THE RELATED ART

Computers and software have become critical tools in today's information based society. Computers and software have provided tools to users to greatly increase work efficiencies. However, with the advantages provided by computers and software come occasional technical problems associated with the computers and software applications. A typical solution to a computer and software technical problem is to contact a technical support person. A user can use a variety of methods to contact a technical support person, e.g., call a designated telephone number, open a chat session, send an email, etc. No matter which method a user chooses to contact a technical support person, a support ticket in a case management tool is created for a particular user's particular technical problem. Case management systems are generally well known systems such as Numara Help Desk™, Sinergia Help Desk™, Issue Tracker, etc.

The support ticket can initially contain a variety of information such as a description of the problem, i.e., a support issue, reporting user, assigned personnel, contact information, etc. As the support issue is resolved the support technician updates the support ticket with information describing how the solution was resolved. Once the support issue is resolved, the ticket and its respective solution are stored within a database of the case management system.

The solutions to the resolved support issues can be of great interest to a wide audience of users. However, the solutions to resolved support issues are not distributed because case management systems are typically closed since they often contain sensitive information. In most cases, the summary and resolution of the case is of interest to the wider audience. Accordingly, there is a need in the art to obtain information from a closed system to an open system, which can then be disseminated to the wider audience.

BRIEF DESCRIPTION OF THE DRAWINGS

Various features of the embodiments can be more fully appreciated, as the same become better understood with reference to the following detailed description of the embodiments when considered in connection with the accompanying figures, in which.

Figure 1:
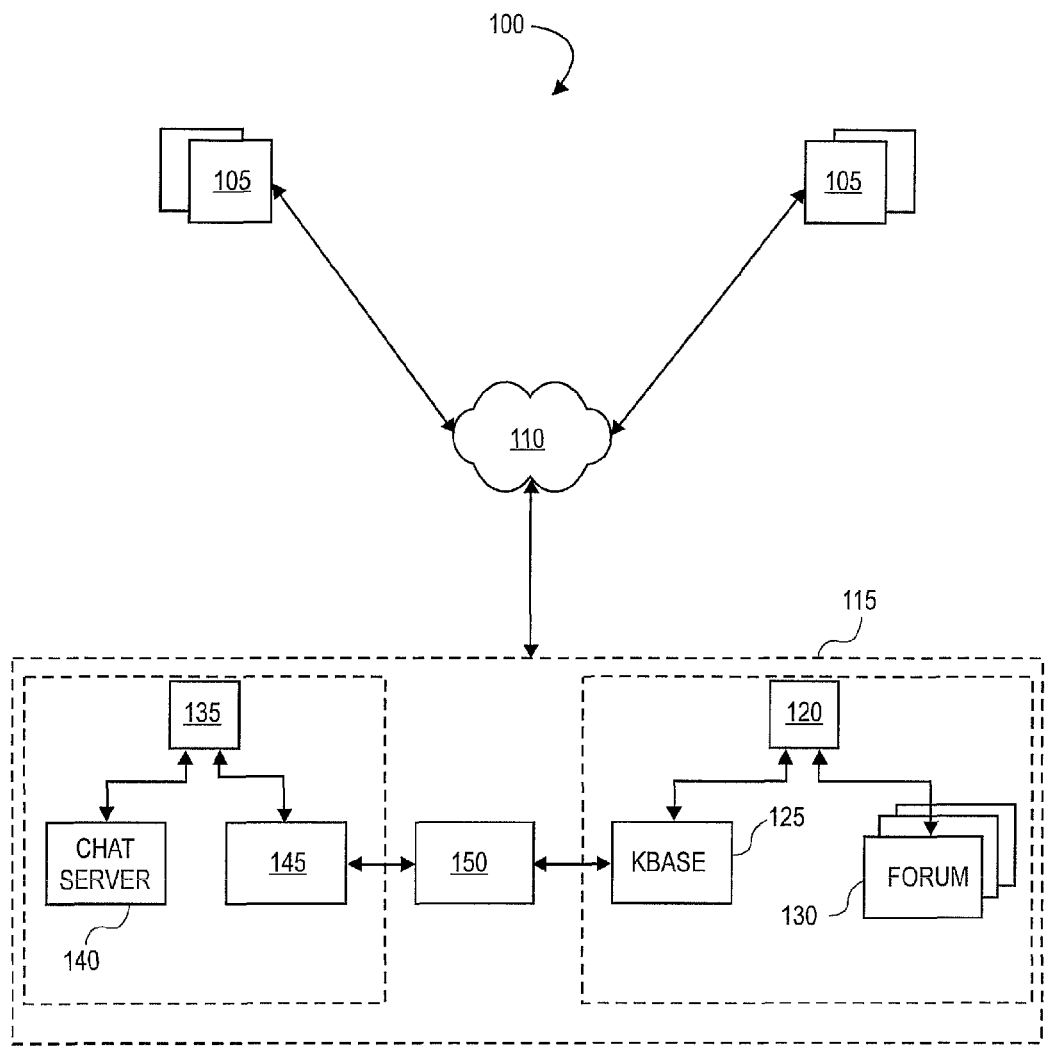
FIG. 1 depicts an exemplary system in accordance with an embodiment.
Figure 3:
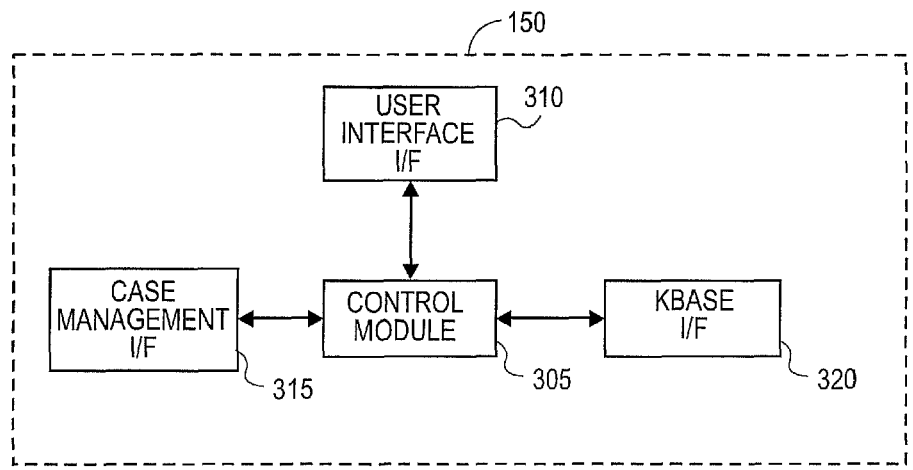
Figure 5:
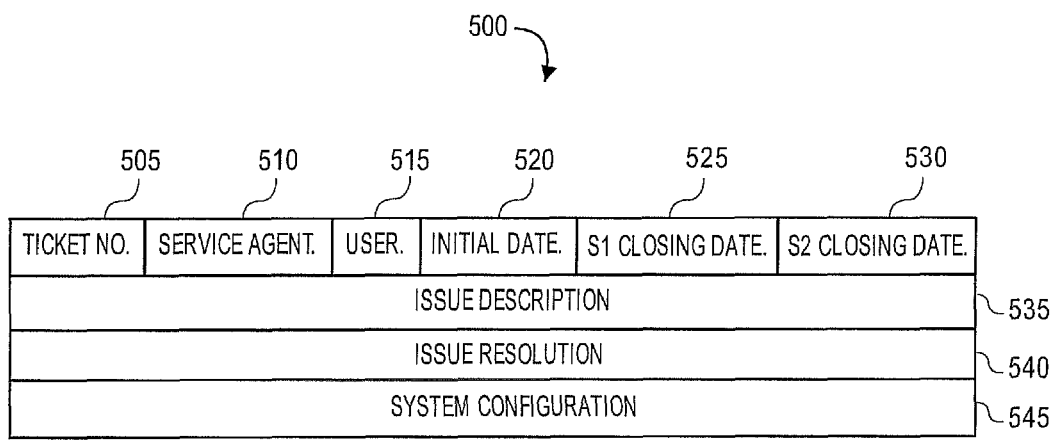
Figure 4:
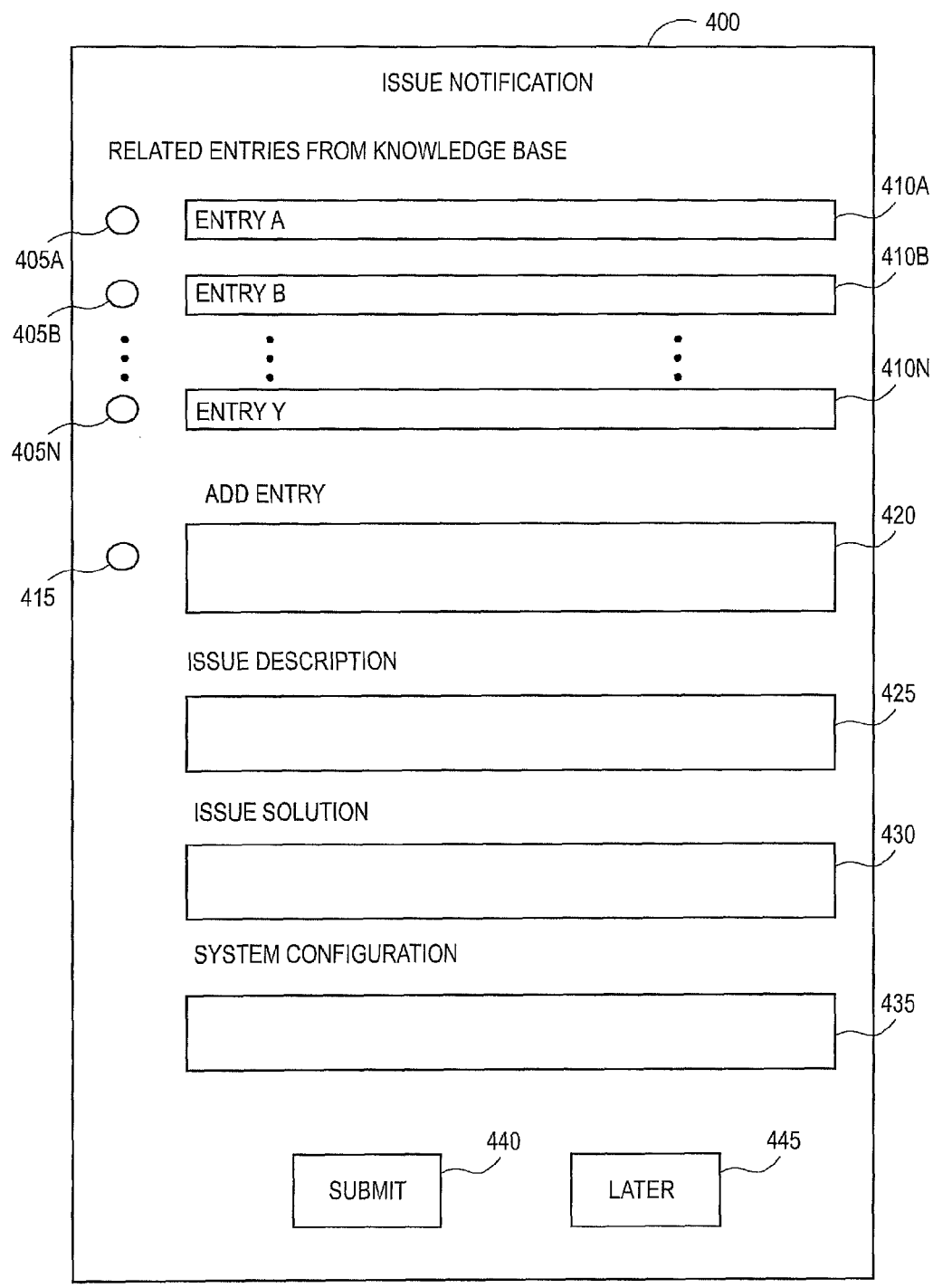
Figure 6:
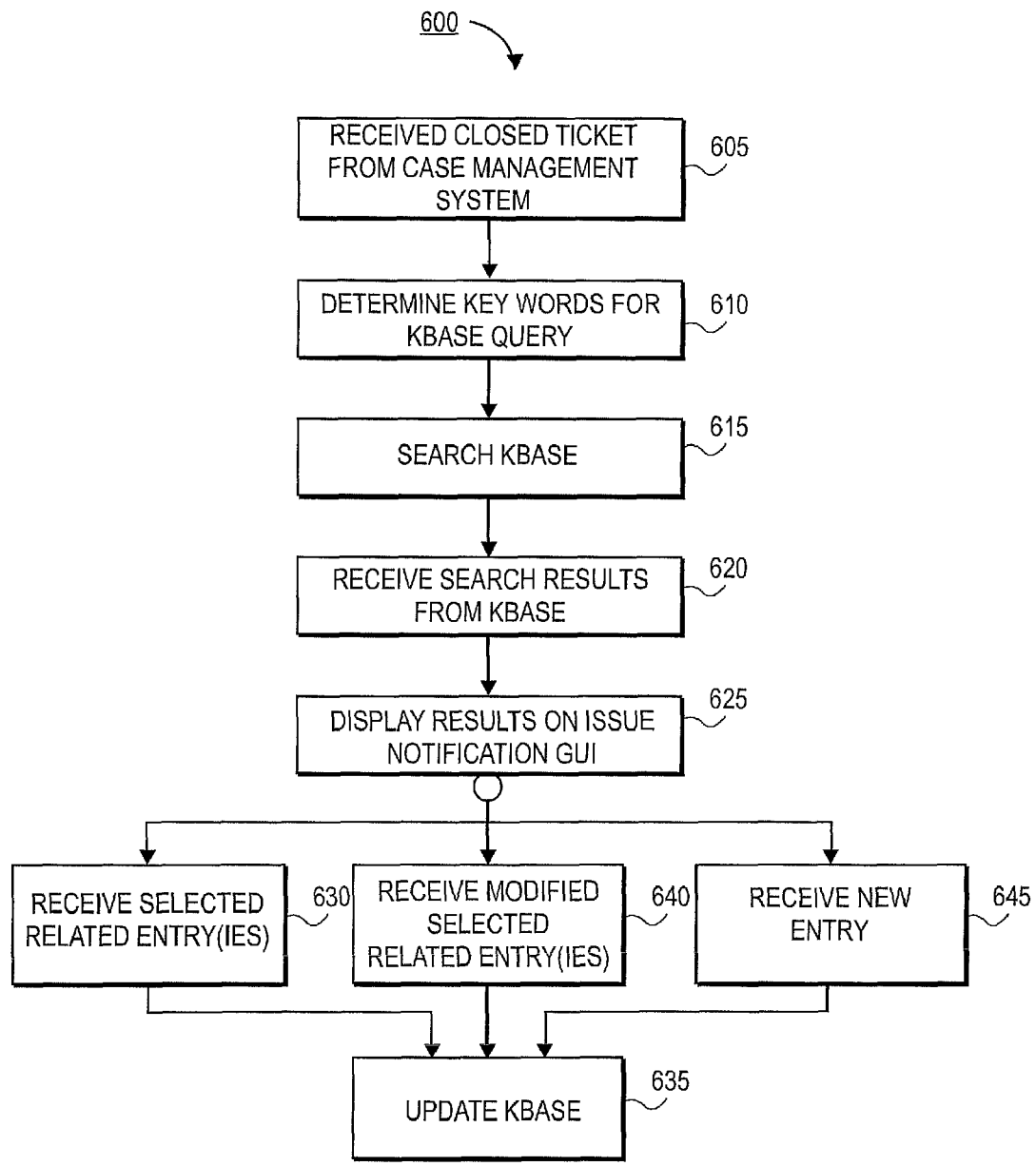
Figure 7:
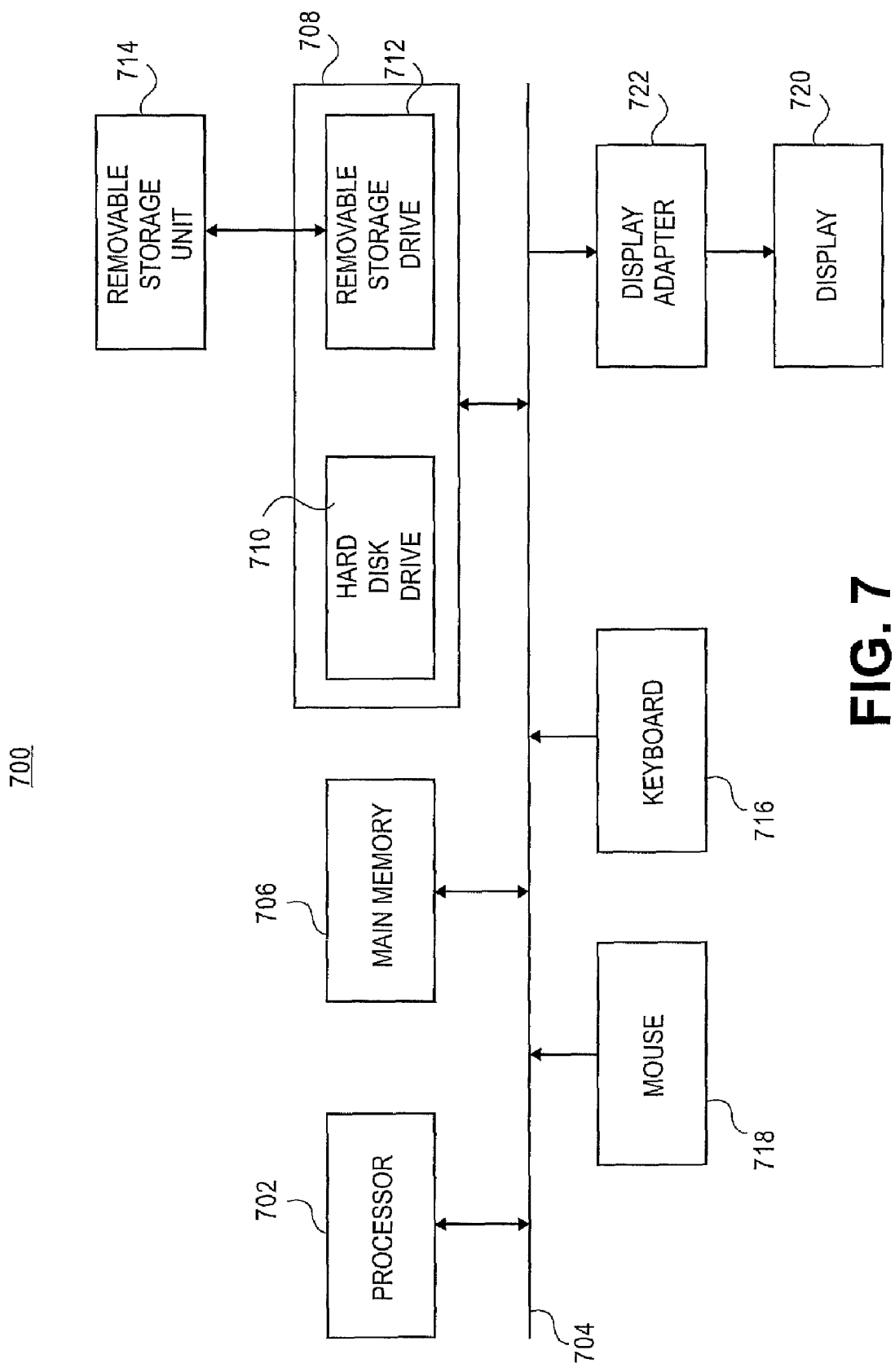

FIG, 2 illustrates an exemplary service portal of the system shown in FIG. 1 in accordance with another embodiment;

FIG. 3 depicts an exemplary knowledgebase linker shown in FIG. 1 in accordance with yet another embodiment;

FIG. 4 illustrates an exemplary issue notification graphical user interface in accordance with yet another embodiment;

FIG. 5 depicts an exemplary closed ticket schema in accordance with yet another embodiment;

FIG. 6 illustrates an exemplary flow diagram in accordance with yet another embodiment;

FIG. 7 depicts an exemplary computing platform in accordance with yet another embodiment.

DETAILED DESCRIPTION OF EMBODIMENTS

For simplicity and illustrative purposes, the principles of the present invention are described by referring mainly to exemplary embodiments thereof. However, one of ordinary skill in the art would readily recognize that the same principles are equally applicable to, and can be implemented in, all types of information and service portals, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments relate generally to systems and methods for a knowledgebase linker that can be configured to link closed support issues with entries in a knowledgebase in a two-stage close. More particularly, a user can contact a help desk of a service portal to resolve a technical issue. An support ticket can be created in a case management system to assist a support technician or engineer, i.e., service agent, to resolve the reported issue. When the ticket is resolved, the underlying case management system can store the closed ticket as a first stage of the two-stage close as well as to associate the closed ticket with the knowledgebase linker.

The knowledgebase linker can be configured to extract key words from the received close ticket to perform a key word search in the knowledgebase. The key words dictionary can be determined by the technical support staff, user community or combinations thereof. The keyword search in the knowledgebase can return related entries from the knowledgebase The knowledgebase linker can then provide the related entries to the assigned service agent. The knowledgebase linker can generate an issue notification graphical user interface ("GUI"), e.g., a web page, that displays a list of related entries associated with the closed ticket as well as an option to add a new entry in the event of the search generating no results. The knowledgebase linker can then forward the issue notification GUI or a link thereto to the assigned service agent by electronic messaging (electronic mail, instant messaging, etc.). The service agent can select the appropriate related entries of the listed entries, supplement the selected related entries with additional description and/or create a new entry for the knowledgebase on the issue notification GUI. The knowledgebase linker can then update the knowledgebase with the relevant information from the closed ticket to the knowledgebase as the second stage of the two-stage close.

FIG. 1 illustrates an exemplary system 100 in accordance with an embodiment. It should be readily apparent to those of ordinary skill in the art that the system 100 depicted in FIG. 1 represents a generalized schematic illustration and that other components may be added or existing components may be removed or modified. Moreover, the system 100 may be implemented using software components, hardware components, or combinations thereof.

As shown in FIG. 1, the system 100 includes users 105, a network 110 and a service portal 115. The users 105 can be private individuals, employees of private business or public entities or other persons interested in accessing the service portal 115. The users 105 can access the service portal 115 using personal computers, personal mobile devices, workstations or other networked computing platforms.

The network 110 can be a combination of wide area and local area networks such as the Internet. The network 110 can be configured to provide a communication channel between the users 105 and the service portal 115. The network 110 can implement a variety of network protocols to provide the communication channel such as Internet Protocol ("IP") Vx, ATM, SONET, or other similar network protocols.

The service portal 115 can be configured to provide products and services to the user 105 as well as provisioning, installation services, updates to software and hardware products, and technical support. The service portal 115 can, among other functions, provide a list of products such as software applications and/or hardware devices as well as services such as installation, configuration, maintenance, etc., for users to purchase. As a non-limiting example, the service portal 115 can also provide information for users to research, compare and purchase software, hardware and consulting services in support of those software and/or hardware purchases. The service portal 115 can also be configured to provide support services by subscription to those same software, service, and/or hardware purchase.

In accordance with various embodiments, the service portal 115 can be configured to provide a knowledge library 120. The knowledge library 120 provides a resource for users to resolve a variety of user issues, including technical issues regarding products and/or services provided by the service portal 115. The knowledge library 120 can contain a knowledgebase (labeled as Kbase) 125, forum(s) 130, frequently asked questions, or other types of electronic self-help services. The knowledgebase 125 can comprise of a database of Wiki-style articles that can be searched, revised and added thereto. The forums 130 can provide a mechanism for user with issues or problems to post questions and receive assistance from the user community.

The service portal 115 can also provide a help desk 135 that is supported by service agents. If a user has the proper entitlement status for access to the help desk 135, a user can contact a service agent for assistance with a technical issue for products and/or services purchased from the service portal 115. The user can contact the service agent using a chat server 140 that provides for chat services, instant messaging services and/or VoIP services. Alternatively, the user can submit a written description of the technical issue, current equipment configuration, and other written information through an issue submission form submitted through electronic messaging techniques. The electronically submitted issue can be automatically processed by the case management system 145 to generate a ticket and assigned a first available service agent.

The service agent can also create a ticket in the case management system 145 to track the submitted technical issue and insert a description of the issue and other related information on the ticket. The ticket can assist the service agent in managing the resolution of the issue and documenting the resolution of the technical issue. When the issue is resolved, the ticket is deemed closed and stored in an associated database of the case management system 145 as stage one of the two-stage close. The case management system 145 can then associate a copy or a link of the closed ticket to the knowledgebase linker 145.

The knowledgebase linker 150 can be configured to provide a link for the relevant information regarding the issue description, software/hardware configuration and issue resolution to the knowledgebase 125. More particularly, the knowledgebase linker 150 can extract key words from a received close ticket to perform a key word search in the knowledgebase 125 on the received closed ticket, where the key words are obtained from a key words dictionary. The key words dictionary can be determined by the technical support staff, user community or a combinations thereof. The keyword search in the knowledgebase 125 can return related entries.

The knowledgebase linker 150 can then provide the related entries to the assigned service agent of the closed ticket or the first available service agent depending on the embodiment. The knowledgebase linker 150 can generate a related issue graphical user interface ("GUI", e.g., a web page) That displays a list of related entries associated with the closed ticket, problem description, problem resolution, any system configuration information, an editing option, and an option to add a new entry in the event of the search returning no results.

The knowledgebase linker 150 can then notify the assigned service agent about the related issue GUI by directly forwarding the related issue GUI or a link thereto by electronic messaging techniques (electronic mail, instant messaging, etc.). The service agent can select the appropriate related entries that already exists in the knowledgebase 125, supplement any selected related entries with additional description that allow the agent to relate an existing entry to the case, and/or create a new entry for the knowledgebase 125 through the related issues GUI. When the service agent activates a submit widget on the related issue GUI, the knowledgebase linker 150 can then update the knowledgebase 125 with the relevant information for the selected related entries as a second stage of the two-stage close in the case management system 145.

Figure 2:
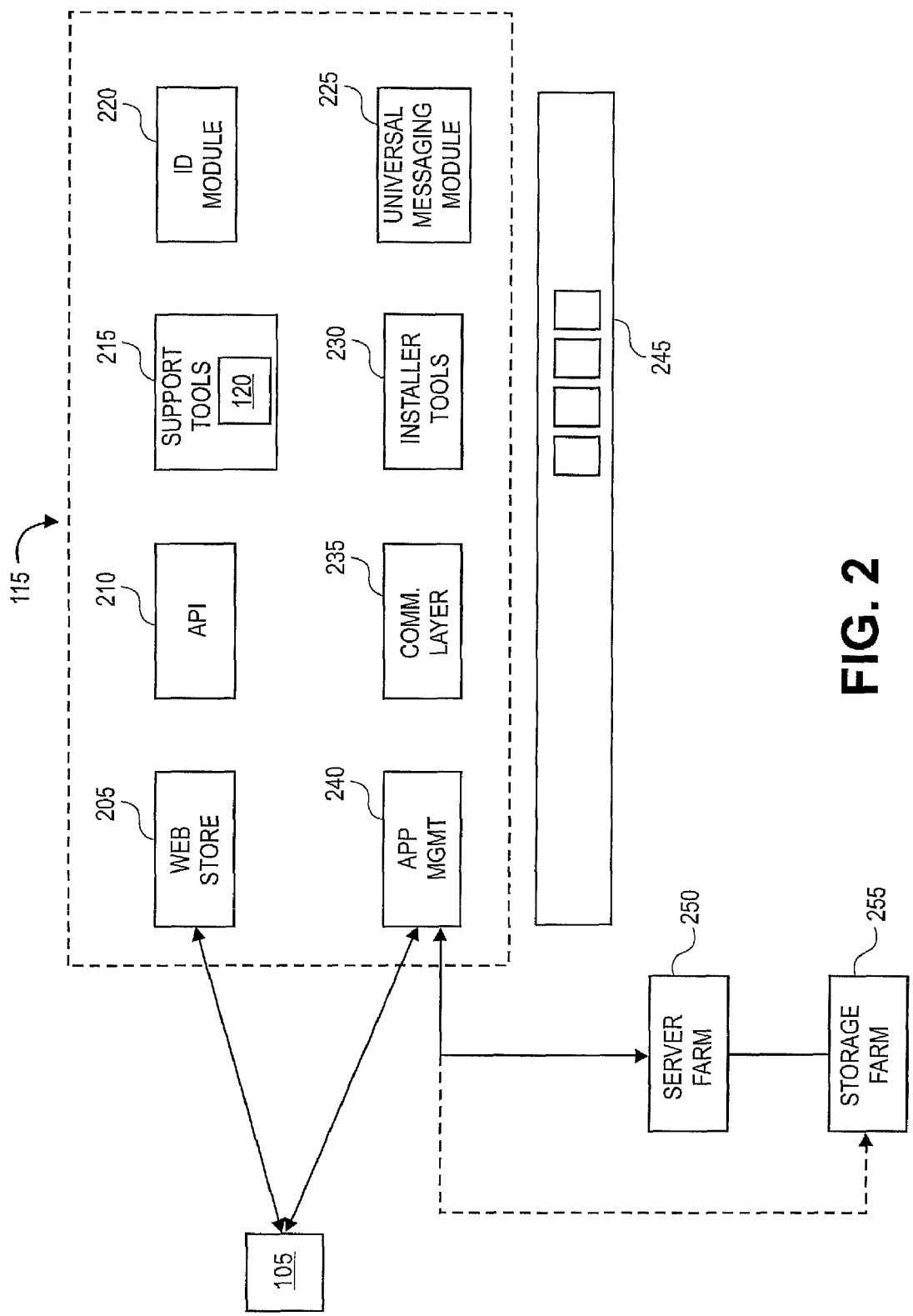

FIG. 2 illustrates a more detailed block diagram of the service portal 115 in accordance with another embodiment. It should be readily apparent to those of ordinary skill in the art that the service portal 115 depicted in FIG. 2 represents a generalized schematic illustration and that other components may be added or existing components may be removed or modified.

As shown in FIG. 2, the service portal 115 can include a web store module 205 that a user can interface with the service portal. The web store module 205 can provide the graphical user interfaces ("GUIs") and associated functions and/or services for the service portal 115. As an non-limiting example, the web store module 205 can generate a log-in GUI for a user to authenticate and enter the service portal 115.

The web store module 205 can couple with an application program interface ("API") module 210. The API module 210 can be configured to provide an interface between the functions and/or services provided by the web store module 205 and to the appropriate module of the service portal 115. More particularly, the API module 210 can call or direct a requested function or service from the user to the respective module that provides that requested function or service. For example, a user may request a price of a product, e g., an electronic mail program, the API module 210 can direct the request to a get price function in a support tools module 215.

The API module 210 can also be configured to interface with the support tools module 215. The support tools module 215 can be configured to provide the supporting software and hardware to implement the functionality of the service portal 115. The support tools module 215 can contain and provide access to databases that contain information such as products lines, services providers, on-line self-help (e.g., knowledgebase 125), etc, The support tools module 215 can also provide services like a chat services, a help desk, installation, provisioning, etc.

The API module 210 can be further configured to couple with an identification ("ID") module 220. The ID module 220 can be configured to provide identification management services for the service portal 115. The ID module 220 can also store information related to users such as purchase history, user profile, usage history of the user, and entitlement data.

The API module 210 can be further configured to couple with a universal messaging module 225. The universal messaging module 225 can be configured to provide a messaging application that unifies messages. More specifically, electronic mail ("email"), documents, and instant messaging can be linked in a single application. The universal messaging module 225 can also provide a mechanism for a user to view all the related documents for the user from email to Wiki pages.

An installer tools 230 can be coupled to the API module 210. One of the services provided by the service portal 115 can be the purchase of software applications provided by independent software vendors ("ISVs"). As part of the delivery of the software applications, the ISV can be required to maintain and update the installation tools to install their respective software applications. Accordingly, the installer tools 230 can be a repository where independent software vendors can deposit their respective installation tools.

The API module 210 can be further coupled to the communication layer 235 (labeled as COMM layer in FIG. 2). The communication layer 235 can be configured to provide the underlying services for the modules of the service portal 115 to communicate. For example, the communication layer 235 can contain middleware for a product database to communicate with a graphical user interface requesting a product description.

The API module 210 can be further coupled to an application management module 240 (labeled as APP MGMT in FIG. 2). The application management module 240 can be configured to manage applications as requested by users. More specifically, a user may purchase a prepackaged software application pack (e.g., an operating system, electronic mail program and data mining program) from the service portal 115, which is stored in an application stack module 245. The application management module 240 can then deliver the purchased software application stack, install and configure the software application stack at a third party site such as a server farm 250 or store the software application stack in a storage farm 255 for the user to retrieve.

The server farm 250 can be configured to provide computing platforms for users to lease. Accordingly, users can have a backup version of their systems, a testing platform to perform quality assurance tests on new applications, execute a program requiring excess MIPS, or any other similar computing task.

The storage farm 255 can be configured to provide storage space for users to lease. Accordingly, users can lease disk storage space to back up data, provide a hot data swap, or other storage intensive tasks.

In some embodiments, the knowledgebase linker 150 can be configured to be executed in the support tools module 215. In other embodiments, the knowledgebase linker 150 can be executed as a standalone module.

FIG. 3 depicts a more detailed block diagram of the knowledgebase linker 150 in accordance with another embodiment. It should be readily apparent to those of ordinary skill in the art that the knowledgebase linker 150 depicted in FIG. 3 represents a generalized schematic illustration and that other components may be added or existing components may be removed or modified.

As shown in FIG. 3, the knowledgebase linker 150 can comprise a control module 305, a user interface module 310, a case management interface (labeled as "CASE MANAGEMENT I/F" in FIG. 3) module 315, and a knowledgebase interface (labeled as "KBASE I/F" in FIG. 3) 320. It should be readily obvious to one of ordinary skill in the art that the depicted modules 305-320 can be implemented as software applications (programmed in C, C++, JAVA, PHP, etc.), hardware components (EEPROM, application specific integrated circuit, microprocessor, etc.) or combinations thereof.

The control module 305 can be configured to manage and interface with the other modules 310-320 to provide the functionality of the knowledgebase linker 150 as described above and further described herein below.

The user interface module 310 can be configured to generate graphical user interfaces ("GUIs") as required by the control module 305. For example, the user interface module 310 can generate an issue notification GUI and/or a link to the issue notification GUI. The issue notification GUI can notify the assigned service agent a list of related entries in the knowledgebase 125 based on a key word search of a received closed ticket, an option to add entries and an option to modify current entries or other related information. An example of the issue notification GUI is shown in FIG. 4.

FIG. 4 depicts an exemplary issue notification GUI 400 in accordance with yet another embodiment. The GUI 400 is merely illustrative and other variations of the GUI 400 are well within the contemplated embodiments. The GUI 400 can be implemented as a graphical page implemented in XML, HTM, SGML, or other mark-up language.

As shown in FIG. 4, the issue notification GUI 400 comprises of selector buttons 405A-N, which are respectively associated with entry text boxes 410A-N and selector button 415, which is associated with add entry text box 420. The issue notification GUI 400 also comprises of an issue description text box 425, an issue solution text box 430, a system configuration text box 435, a submit button 440, and a later button 445.

The entry text boxes 410A-N can each store a related entry from the knowledgebase 125 that was returned on a key word search extracted from a received closed ticket. The number of entry text boxes 410A-N is dependent on the number of found related entries from the knowledgebase 125. The entry text boxes 410A-N can also be editable to allow the service agent to create a new entry for the knowledgebase 125.

Accordingly, the service agent can select any number of related entries to update with the relevant and non-confidential information, i.e., the issue description, issue resolution and system configuration, from the received close ticket. The selected entries of entry text boxes 410A-N can then be updated with the relevant information.

The add entry text box 420 can be text box that the service agent can add a new entry for the knowledgebase 125 in the event that the service agent is not satisfied with the existing list of related entries or the key word search did not return any results. The activation of associated selector button 415 will update the information contained in the add entry text box 420 to the knowledgebase 125 with the relevant information from the closed ticket.

The issue description text box 425 can contain a description of the issue that was retrieved from the closed ticket. This text box 425 can also be editable by the service agent to supplement the description or to remove confidential information. The issue solution text box 430 can contain a description of the resolution of the issue. In some cases, the issue may not be resolved because it was traced to a known bug being resolved by the vendor. The system configuration text box 435 can contain a description of the computer system of the reporting user which can include hardware, software, and configuration information.

The submit button 440 can be configured to update the knowledgebase 125 with any selected related entries for text boxes 410A-N and 420 by activation of the respective selector buttons 405A-N and 415. In one update process, the text from the issue description text box 425, the issue resolution text box 430, and the system configuration text box 430 is updated to the knowledgebase 125 to the selected related entries. Alternatively, the knowledgebase linker 150 can update the related entries with links to an issue description field, an issue resolution field, and a system configuration field of the database record for the closed tickets. An example of the schema for a closed ticket is depicted in FIG. 5.

FIG. 5 illustrates an exemplary closed ticket record 500 in accordance with yet another embodiment. It should be readily apparent to those of ordinary skill in the art that the closed ticket record 500 shown in FIG. 5 represents a generalized schematic illustration and that other fields can be added or existing fields can be removed or modified.

As shown in FIG. 5, the closed ticket record 500 can comprise a ticket number (labeled as "TICKET NO.") field 505, a service agent field 510, a user field 515, an initial date field 520, a stage one closed date (labeled as "S1 CLOSE DATE") field 525, a stage two close date (labeled as "S2 CLOSE DATE") field 530 an issue description field 535, an issue resolution field 540, and a system configuration field 545.

The ticket number field 505 can store the ticket number of the ticket. The ticket number can be a numerical identification method to reference the issue. The service agent field 510 can store The identity of the service agent working on the issue. The user field 515 can store the identity of the user reporting information. This field can also contain user contact information, user history, and other related user information that may be needed by the case management system 145.

The initial date field 520 can contain the date of when the issue was reported to the case management system 145. The stage one closed date field 525 can contain the date the issue was resolved by the service agent in the case management system 145. The stage two closed date field 530 can contain the date was the issue was updated to the knowledgebase 125.

The issue description field 535 can store a description of the issue. The issue resolution field 540 can store a description of the resolution of the issue by the service agent. The system configuration field 545 can contain the information related to the hardware, software, and configuration information of the reporting user's system.

Returning to FIG. 4, the issue notification GUI 400 can farther comprise a later button 445. When activated, the control module 305 can be configured to close the GUI 400 and wait for a predetermined amount of time. For example, the delay may be a half hour. The delay may be used to allow the service agent to finish a current issue or is busy with other matters. However, in an effort to keep the knowledgebase 125 updated, the control module 305 can return the issue notification GUI to the service agent's display until the service agent closes the issue notification GUI 400 by activating the submit button 440, that is, stage two of the two-stage close.

Returning to FIG. 3, in some embodiments, the user interface module 310 can be considered an application program interface module which provides the necessary tools and interfaces to communicate with other modules of the knowledgebase linker 150 and the other modules of the service portal 115.

The control module 305 can be configured to couple with the case management interface module 315, which provides a communication channel for the control module 305 to receive a copy of the closed ticket or a link to the closed ticket. The case management interface module 315 can be implemented as an application program interface ("API"), a function call, a remote procedure call, or other similar mechanism.

The control module 305 can be further coupled to the knowledgebase interface 320. The knowledgebase interface 320 can provide a communication channel for the control module 305 to query the knowledgebase 125 as well as to update relevant information from the closed ticket to the knowledgebase 125 either directly or by a link. Similar to the case management interface module 315, the knowledgebase interface 320 can be implement with an API, a function call, a remote procedure calls, or other similar mechanism.

FIG. 6 illustrates an exemplary flow diagram 600 executed by the knowledgebase linker 150 in accordance with yet another embodiment. It should be readily apparent to those of ordinary skill in the art that the flow diagram 600 depicted in FIG. 5 represents a generalized schematic illustration and that other steps may be added or existing steps may be removed or modified.

As shown in FIG. 6, the control module 305 can be configured to receive a copy of the closed ticket from the case management system 145, in step 605. The control module 305 can extract out the non-confidential information from the closed ticket, i.e., service agent, issue description, issue resolution and system configuration, and temporarily buffer the closed ticket. In some embodiments, the control module 305 can receive a link to the closed ticket from the case management system 145. The control module 305 can then query the database associated with the case management system 145 to retrieve the non-confidential relevant information from the respective fields (530-540) of closed ticket record 400 associated with the received closed ticket. This information can also be buffered by the control module 305 when received.

In step 610, the control module 305 can be configured to perform a key word search on the non-confidential information using a key word dictionary. The system administrators, technical support staff of the service portal, and/or users may have determine the terms in the key word dictionary. The resulting key words from the non-confidential information can then be temporarily buffered by the control module.

In step 615, the control module 305 can query the knowledgebase 125 with the extracted key words from the received closed ticket. The control module 305 can then receive the results from the knowledgebase 125, in step 620.

In step 625, the control module 305 can display the search results from the knowledgebase 125. More specifically, the control module 305 can populate the received related entries from the knowledgebase 125 in a respective entry text box 410A-N in an issue notification GUI 400. The number of text boxes being used is dependent on the number of the related entries returned. The control module 305 can then send the issue notification GUI 400 to the assigned service agent on the closed ticket.

In step 630, the control module 305 has received the selected related entries from the service agent upon activation of the submit button 440. More specifically, the service agent had activated at least one of the selector buttons 405A-405N to indicate the selected related entries. Subsequently, the control module 305 can be configured update the selected related information with the issue description, issue resolution, and configuration information or post a link to this information, in step 635.

In step 640, the control module 305 has received the modified entries from the service agent upon activation of the submit button 440. The service agent can select the appropriate selector button (405A-N) for the related entry to be modified. Since the entry text boxes 410A-N are editable, the service agent can add or delete the selected related entry as needed. Subsequently, the control 305 can proceed to the processing of step 635.

In step 645, the control module 305 has received a new entry upon activation of the submit button 440. More specifically, the service agent selected the selector button 415 and added a new entry in the add entry text box 420. The added text is then updated along with the issue description, issue resolution, and system configuration information (or a link thereto) to the knowledgebase 125, in step 445.

For the processing associated with steps 630, 640, and 645, all three events can occur individually or in combinations. For example, a service agent can select any number related entries and add a new entry to the knowledgebase 125.

FIG. 7 illustrates an exemplary block diagram of a computing platform 700 where an embodiment may be practiced. The functions of the knowledgebase linker 150 may be implemented in program code and executed by the computing platform 700. The knowledgebase linker 150 may be implemented in computer languages such as PASCAL, C, C++, JAVA, etc.

As shown in FIG. 7, the computer system 700 includes one or more processors, such as processor 702 that provide an execution platform for embodiments of the knowledgebase linker 150. Commands and data from the processor 702 are communicated over a communication bus 704. The computer system 700 also includes a main memory 706, such as a Random Access Memory (RAM), where the knowledgebase linker 150 may be executed during runtime, and a secondary memory 708. The secondary memory 708 includes, for example, a hard disk drive 710 and/or a removable storage drive 712, representing a floppy diskette drive, a magnetic tape drive, a compact disk drive, etc., where a copy of a computer program embodiment for the knowledgebase linker 150 may be stored. The removable storage drive 712 reads from and/or writes to a removable storage unit 714 in a well-known manner. A user interfaces with the knowledgebase linker 150 with a keyboard 716, a mouse 718, and a display 720. The display adapter 722 interfaces with the communication bus 704 and the display 720. The display adapter 722 also receives display data from the processor 702 and converts the display data into display commands for the display 720.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method of linking, the method comprising:
receiving an indication of a ticket that was closed by a case management system, wherein the indication comprises a description of the closed ticket;
comparing the description to a key word dictionary to identify a key word of the description that matches a term in the key word dictionary;
searching, by a processor, a knowledgebase with the key word of the description to obtain at least one entry related to the closed ticket, wherein the knowledgebase comprises a set of revisable entries;
updating the at least one related entry with the description; and
storing the updated at least one related entry in the knowledgebase.

2. The method of claim 1, wherein searching the knowledgebase comprises:
buffering the indication; and
extracting the description from the indication.

3. The method of claim 1, further comprising:
receiving the at least one related entry; and
populating the at least one related entry and the description in a graphical user interface.

4. The method of claim 3, further comprising sending at least one of the graphical user interface and a link to a service agent.

5. The method of claim 4, further comprising receiving a selection of the at least one related entry being associated with the description from the service agent.

6. An apparatus for linking, the apparatus comprising:
a processor configured to execute a control module;
a first interface coupled to the control module and configured to receive messages associated with technical issues from a case management system; and
a second interface coupled to the control module and configured to exchange information with a knowledgebase, wherein the control module is configured to receive an indication of a ticket that was closed by the case management system, wherein the indication comprises a description of the closed ticket, to compare the description to a key word dictionary to identify a key word of the description that matches a term in the key word dictionary, to search a knowledgebase with the key word of the description to obtain at least one entry related to the closed ticket, wherein the knowledgebase comprises a set of revisable entries, to update the at least one related entry with the description, and to store the updated at least one related entry in the knowledgebase.

7. The apparatus of claim 6, wherein the control module is further configured to buffer the indication and to extract the description from the indication.

8. The apparatus of claim 6, wherein the control module is further configured to receive the at least one related entry and to populate the at least one related entry and the description in a graphical user interface.

9. The apparatus of claim 8, wherein the control module is further configured to send at least one of the graphical user interface and a link to an assigned agent.

10. The apparatus of claim 9, wherein the control module is further configured to receive a selection of the at least one related entry being associated with the description from the assigned agent.

11. A system for linking, the system comprising:
a processor configured to execute a linker;
a case management system coupled to the linker, the case management system configured to forward messages associated with technical issues to the linker; and
a library system coupled to the linker, the library system configured to exchange information with the linker, wherein the linker is configured to receive an indication of a ticket that was closed by the case management system, wherein the indication comprises a description of the closed ticket, to compare the description to a key word dictionary to identify a key word of the description that matches a term in the key word dictionary, to search a knowledgebase with the key word of the description to obtain at least one entry related to the closed ticket, wherein the knowledgebase comprises a set of revisable entries, to update the at least one related entry with the description, and to store the updated at least one related entry in the knowiedgebase.

12. The system of claim 11, wherein the linker is further configured to buffer the indication and to extract the description from the indication.

13. The system of claim 11, wherein the linker is further configured to receive the at least one related entry and to populate the at least one related entry and the description in a graphical user interface.

14. The system of claim 13, wherein the graphical user interface is one of an HTML page, an XML page, and an SGML page.

15. The system of claim 13, wherein the linker is further configured to send at least one of the graphical user interface and a link to an assigned agent.

16. The system of claim 15, wherein the linker is further configured to receive a selection of the at least one related entry being associated with the description from the assigned agent.

* * * * *